April 7, 1925.                    O. KITA                    1,532,413

STATIONARY KNIFE

Filed Sept. 22, 1924

INVENTOR.
Otonosuke Kita
BY M. C. Frank
ATTORNEY.

Patented Apr. 7, 1925.

1,532,413

UNITED STATES PATENT OFFICE.

OTONOSUKE KITA, OF IRVINGTON, CALIFORNIA.

STATIONARY KNIFE.

Application filed September 22, 1924. Serial No. 739,030.

*To all whom it may concern:*

Be it known that I, OTONOSUKE KITA, a subject of the Emperor of Japan, residing at Irvington, in the county of Alameda, State of California, have invented certain new and useful Improvements in Stationary Knives, of which the following is a specification.

My invention relates to stationary knives, and in particular to knives of this character for the cutting of fresh fruits and vegetables or the like.

At present, and as far as I am aware, knives and other instruments for the cutting of fruits and vegetables in canneries and fruit-drying establishments are longitudinally movable and by hand, and the preferential cutting instrument seems to be the common paring knife. In the use of hand knives, one hand is used to hold the fruit and the other hand to grip the knife and pass the blade thereof through the fruit. Progress in cutting great quantities of fruit in this manner is slow compared to my improved knife, and which knife is stationary and permits both of the hands to grip and hold the fruit and pass it through the knife in any manner best suited to the operator. Many operations or movements are eliminated by the use of my knife, hence, speed, safety, uniformity and clean cutting are attained.

The latter are among my objects; and further objects are: The provision of a flat and thin knife made from metal-plate and attachable to a convenient support; that the cutting edges be somewhat of horseshoe-shape in form and that the said edges be oppositely disposed and of uniform formation; and that the said curved knife shall have a narrow cutting entrance and immediately increasing to a wider cutting clearance; and that the base of the knife be centrally cut-away to permit ease in sharpening the device when unattached to a support.

With the above and other objects in view, I will now describe an exemplifying construction in which the invention is embodied. This is the best form that I have devised up to the present time, but it should be understood that the invention is capable of embodiment in other forms.

Figure 1:
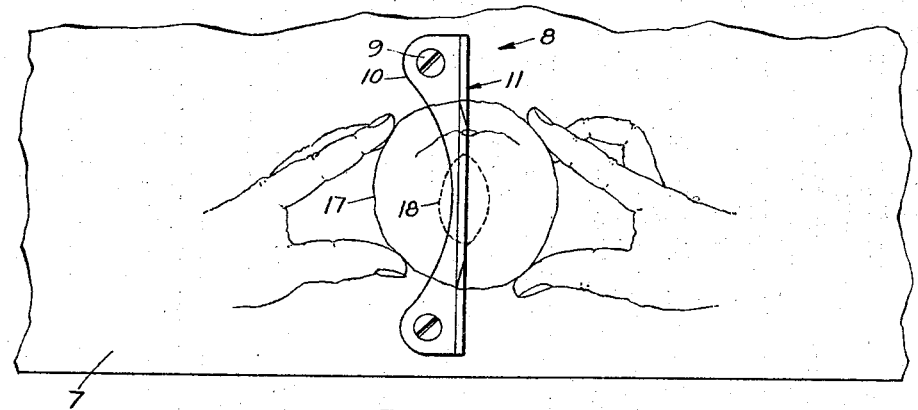
Figure 1 is a plan of my improved knife shown in heavy lines and secured to a support shown in lighter lines; also a peach is shown held superposed on the knife by the hands and ready to be passed through the blades for halving.
Figure 2:
Fig. 2 is a detached plan of the knife of Fig. 1.
Figure 3:
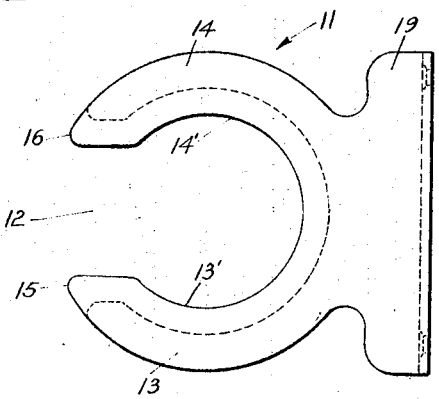
Fig. 3 is a side elevation of it, and Fig. 4 a mid-section of Fig. 2.
Figure 4:
Figure 5:
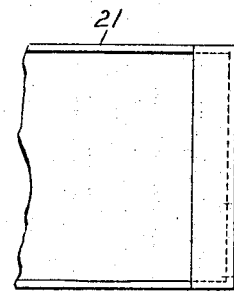
Fig. 5 is a plan of a modified form of the invention attached to an end of a field lug-box.
Figure 6:
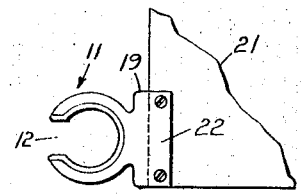
Fig. 6 is an end elevation of it.

Adverting to the drawing and figures thereof: The numeral 7 indicates a support, such as a table in a cannery for example, and to which my invention represented by 8 is secured as by screws 9 through the horizontal base 10 of the structure.

11 is the knife part of the invention, and is preferably positioned vertically with respect to the support. The knife includes a plate, preferably of tool steel, of ring-like formation having a slot or opening 12 cut therefrom at its top, forming substantially a horseshoe-shaped knife with opposed blades 13 and 14 whose inner edges 13' and 14' and tips 15 and 16 are sharpened as shown by the bevelled edges throughout the figures. The said opening 12 is of narrower width than the balance of the cutter to momentarily rest and center the fruit 17 thereon, but of sufficient width to pass the stone 18 therethrough with ample clearance.

Extending from the cutter of the instrument is an extension 19 joining the aforemention base 10. The latter is cut-away as at 20 to permit the sharpening of the bevelled edge with ease when the knife is detached from its support.

In some cases, as in drying the fruits right out in the field, I may wish to support a knife direct to a field lug-box 21 and to an end thereof. The base 22 may then be a continuation of the extension 19 if desired. In using this adaptation of the cutter, the other field workers bring their loaded lugboxes direct to the field cutter.

In operation, the fruit is held gripped between the two hands, centered over the knife and pushed downwards, then toward or away from the operator to suit his preferential way and with a slight turning movement. The stone of the fruit easily separates with a half of it. One learns to cut fruit very efficiently with this stationary knife in a very short time, and his output of cut products is usually more than double compared to the common paring knife method.

What I claim as new and desire to secure by Letters Patent of the United States is the following:

A fruit knife of the character described, consisting of a single piece of sheet metal having a supporting base at its lower portion and a ring-like knife at its upper portion, the uppermost portion of the ring being slotted forming thereby a narrow entrance to the opening in the ring and a pair of vertically-positioned converging blades, the tips of said converging blades adapted for momentarily resting and centering the fruit thereon, and said converging blades further adapted to present a minimum cutting edge exposed to the fingers.

In testimony whereof I affix my signature.

OTONOSUKE KITA.